United States Patent
Perdrieau et al.

[11] Patent Number: 5,844,610
[45] Date of Patent: Dec. 1, 1998

[54] ADAPTIVE METHOD AND DEVICE FOR SUB-BAND ANALYSIS AND SYNTHESIS

[75] Inventors: Laurent Perdrieau, Rennes; Michel Pecot, Thorigne-Equillard, both of France

[73] Assignee: Thomson-CSF, Paris, France

[21] Appl. No.: 375,737

[22] Filed: Jan. 20, 1995

[30] Foreign Application Priority Data

Jan. 21, 1994 [FR] France ................................ 94 00633

[51] Int. Cl.⁶ ........................................ H04N 7/12
[52] U.S. Cl. ........................................ 348/398; 348/438
[58] Field of Search ................................ 382/239, 240, 382/261; 348/398, 397, 437, 438; 364/724.18, 724.19

[56] References Cited

U.S. PATENT DOCUMENTS

| | | | |
|---|---|---|---|
| 5,122,873 | 6/1992 | Golin | 382/240 |
| 5,218,435 | 6/1993 | Lim et al. | 348/398 |
| 5,327,366 | 7/1994 | Mau | 364/724.18 |
| 5,353,059 | 10/1994 | Lawler et al. | 348/398 |
| 5,446,495 | 8/1995 | Tourtier et al. | 348/398 |
| 5,469,517 | 11/1995 | Ohta | 348/398 |
| 5,481,308 | 1/1996 | Hartung et al. | 348/398 |

*Primary Examiner*—Victor R. Kostak
*Attorney, Agent, or Firm*—Oblon, Spivak, McClelland, Maier & Neustadt, P.C.

[57] ABSTRACT

An adaptive method for television image encoding by splitting the video image to be transmitted into sub-bands at the time of analysis filtering of the image encoder. These sub-bands are split into a tree-like structure by filtering and decimation. Local adaptive filtering is carried out in the analysis filters of each sub-band.

11 Claims, 4 Drawing Sheets

ADAPTIVE METHOD AND DEVICE FOR SUB-BAND ANALYSIS AND SYNTHESIS

BACKGROUND OF THE INVENTION

1. Field of the Invention

The present invention relates to an adaptive method and device for sub-band analysis and synthesis.

It can be applied to the making of systems for the transmission and reception of digital video signals and notably to systems for the compatible encoding and decoding of television images.

2. Description of the Prior Art

A known way of obtaining the compatibility of the different standards of television signals is to split up or slice these signals hierarchically into sub-bands. Corresponding devices are known, for example, from the French patent applications Nos. 2 643 531 and 2 654 887 filed on behalf of the present Applicant. The splitting up of the 2D spectrum of the image is obtained by means of a separable arborescent splitting obtained by means of low-pass and high-pass semi-band filters respectively coupled to sub-sampling devices that are decimators by two. The filters used for the splitting are determined on a priori basis and are identical for all the levels of the splitting tree. The tree is chosen so as to provide for sufficient whiteness by means of a sufficiently extensive splitting. However, the more extensive this splitting, the greater is the propagation of the errors. Since the filters are designed so as to split up the signals into two bands of identical width while at the same time minimizing the energy in the split band, the cut-off frequency being equal to $\pi/2$, a sub-band filtering bank thus formed results in medium quality behavior with respect to all the signals to be filtered, from the viewpoint of the decorrelation of the sub-band signals.

The aim of the invention is to overcome the above-mentioned drawbacks.

SUMMARY OF THE INVENTION

To this end, an object of the invention is an adaptive method of sub-band analysis and synthesis for image encoders and decoders linked by a transmission channel of the type consisting, at the analysis filters, in splitting up the signal to be transmitted on the transmission channel into sub-bands in an arborescent structure by filtering and decimation wherein said method consists of the performance, in the analysis filters, of a local adaptive filtering in each sub-band.

BRIEF DESCRIPTION OF THE DRAWINGS

Other features and advantages of the invention shall appear from the following description, made with reference to the appended drawings, of which.

MORE DETAILED DESCRIPTION

Figure 1:
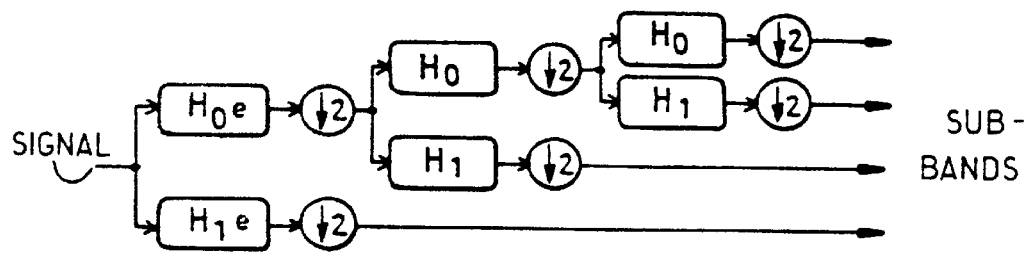
FIG. 1 shows a bank for hierarchical analysis into sub-bands according to the prior art.
Figure 2:
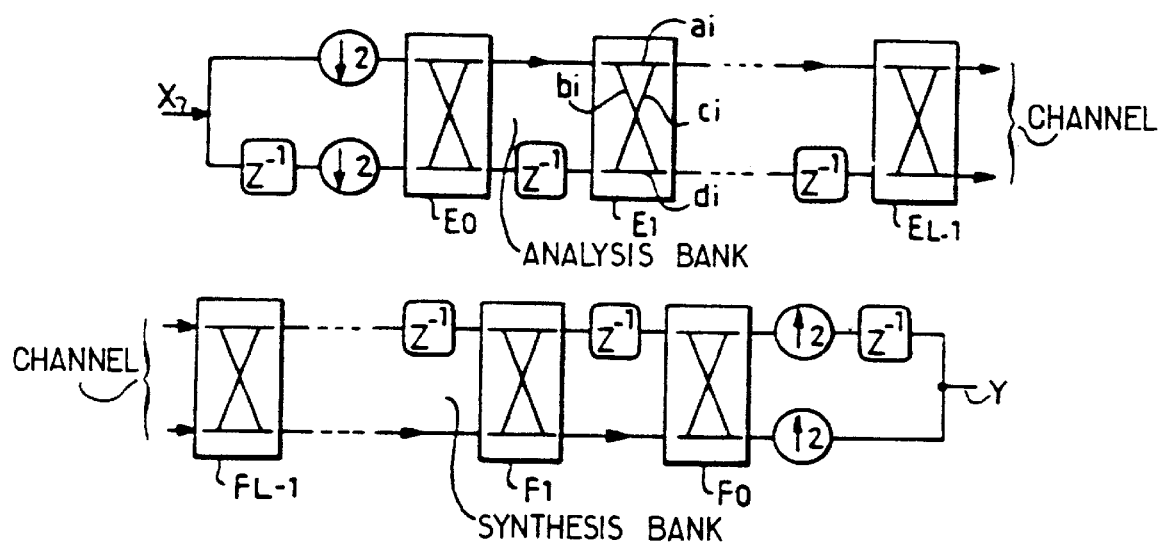
FIG. 2 shows a trellis structure of a bank of filters.

Sub-band filtering forms part of the so-called transform techniques of decorrelation. A bank for splitting up signals into sub-bands is formed by an analysis part that splits up the signal and a synthesis part that reconstructs the signal from the sub-bands. The splitting of a signal into M bands can be done either by a set of parallel-connected filters or by the cascade-connection of splitting cells with few bands typically comprising two bands. In the latter case, the hierarchical splitting of the signal is structured as shown in FIG. 1. The corresponding arborescent structure is formed by two-band analysis/synthesis cells also known as octave splitting cells. Each cell is formed by a pair of filters referenced $H_0$ and $H_1$. To keep a total bit rate that is constant, the signals at output of the analysis cells are sub-sampled at a critical rate R=2. The signals applied to the inputs of the corresponding synthesis cells (not shown) are over-sampled by two. A structure such as this, in the case of the filtering of images whose corresponding signals are, by nature, non-stationary signals, makes it possible to obtain an appreciable gain in terms of decorrelation and therefore in terms of encoding if the analysis/synthesis system is capable of adapting to the local characteristics of the images. For this type of structure, two possibilities have to be envisaged. They consist either in adapting the splitting tree or in adapting the filters, without either one of the methods excluding the other. Rather than adapting the analysis to the signals to determine the splitting tree structure best suited to the signal for a pair of filters $H_0$ and $H_1$ that is determined on an a priori basis, the idea of the invention comprises a complementary approach that consists in determining a method of adapting the filters to the statistical properties of the input signal. It pertains more particularly to the case of the filtering of images by hierarchical octave splitting banks using separable filters. The use of separable filters where the filtering is independent on the rows and columns of the image enables the processing operations to be reduced to the case of one-dimensional signals. Furthermore, only the splitting banks providing for the perfect reconstruction of the signal without quantification of the sub-band signals are to be considered. Two categories of filters can be used to obtain these results, these filters being known as conjugated quadrature filters (CQF) and as bi-orthogonal linear phase filters. In the CQF type filters, the filters with the transfer function $H_0$ and $H_1$ are inverted versions of each other. Within a dyadic splitting, they correspond to orthogonal wavelets. Among the bi-orthogonal linear phase filters, two approaches can also be achieved depending on the parity and the symmetry of the filters $H_0$ and $H_1$. These filters are known, on the one hand, as symmetric-symmetric-even-even (SSEE) filters and have the property of using symmetric and even-parity filters $H_0$ and $H_1$ and, on the other hand, as symmetric-antisymmetric-odd-odd (SAOO) filters where the $H_0$ and $H_1$ filters are respectively symmetrical and antisymmetrical odd-parity filters. The SSEE type filters dictate different lengths on the filters $H_0$ and $H_1$. In the embodiments of the invention described here below, only the CQF and SAOO type filters are considered. The categories of filters chosen exist in a transversal form and also in a trellised form. The trellis-structure filters provide for the perfect reconstruction of the signal independently of the values of the coefficients. A generalized trellis structure such as the one shown in FIG. 2 incorporates both cases of filters, namely CQF and SAOO filters. In FIG. 2, each cell of the trellis of the analysis filter $E_i$ has its parameters set by four coefficients $a_i$, $b_i$, $c_i$ and $d_i$ forming the transfer matrix of the cell. This transfer matrix $E_i$ is represented in the form $$E_i = \begin{pmatrix} a_i & c_i \\ b_i & d_i \end{pmatrix} \quad (1)$$

In order to avoid a degeneration of the trellis-structure cells, it is necessary to lay down that the determinant of the matrix $E_i$ should be different from zero. For easy computation, its value is laid down as being equal to 1. The CQF type trellis structures are obtained from the generalized trellis by requiring that the coefficients of the cells $E_i$ should satisfy the relationships $a_i = d_i$ and $b_i = -c_i$. In the same way, the SAOO type trellis structures dictate the relationships $a_i = d_i$ and $b_i = c_i$ on the cells $E_i$ and also dictate the addition of a terminal cell at output of the filters, the transfer matrix of which is defined by the relationship:

$$T_{SAOO} = \begin{pmatrix} 1 & 1 \\ 1 & -1 \end{pmatrix} \quad (2)$$

In an optical device for the compression of images and compatible encoding of television signals, the filters are optimized according to a criterion that brings the cost of encoding into play. This cost, for two independent signals having a mean value of zero, is proportional to the product of the values of variance of the two signals. The criterion of optimization that is chosen for the implementation of the invention has the form:

$$C(H_0, H_1) = \mu_1 \cdot R_{00}(0) \cdot R_{11}(0) + \mu_2 \cdot \frac{1}{2M_1 + 1} \sum_{l=-M_1}^{M_1} R_{01}^2(l) + \mu_3 \cdot \frac{1}{M_2} \sum_{l=1}^{M_2} [R_{00}^2(l) + R_{11}^2(l)] \quad (3)$$

where $R_{ij}(l)$ represents the intercorrelation of the delay l between the signals i and j at output of the filters $H_0$ and $H_1$ and after sub-sampling. The coefficients $\mu_1, \mu_2$ and $\mu_3$ enable the modulation of the contribution of each of the terms. The first term tends to minimize the cost of encoding on an assumption of independence and of whiteness of the sub-band signals. The second term seeks to make the two sub-band signals independent for an inter-band decorrelation and the third term contributes to the whitening of the signals for an intra-band decorrelation (by analogy with the spectrum of a white noise).

Figure 3:
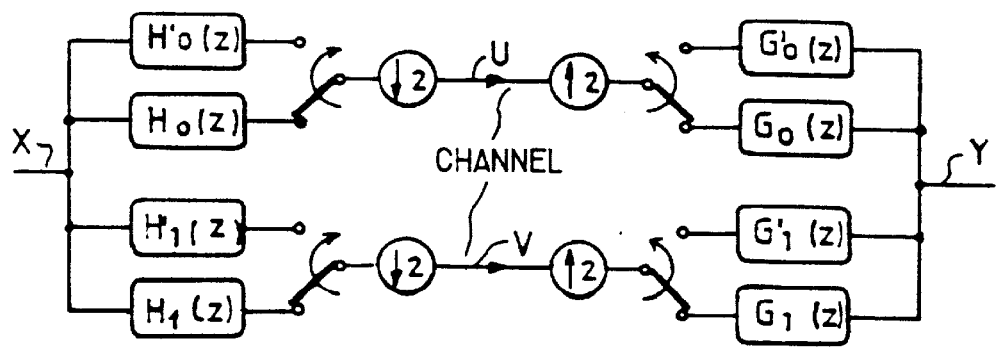
FIG. 3 shows an implementation of a device for the switching of filters for the analysis and synthesis of a signal split up into sub-bands.
Figure 4:
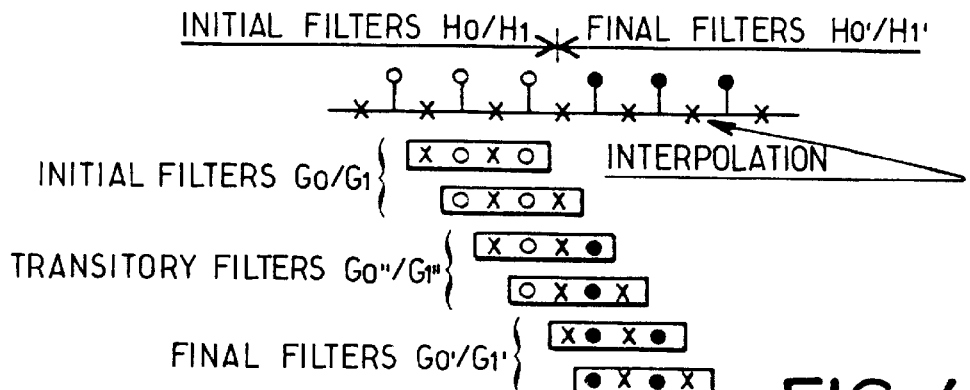
FIG. 4 shows an organization of synthesis filters making it possible to maintain the property, of these synthesis filters, of perfect reconstruction during a switching of filters.

In order to avoid a search for the optimization of the splitting filters of a sub-band filtering bank on the basis of the overall statistics of the signal, leading to medium-quality results due to the fact that the images are non-stationary, the method according to the invention consists in adapting the filters to the local characteristics of the image. This makes it necessary for the analysis filters to be modified during the filtering as a function of the statistics measured in the vicinity of each current pixel or picture dot. Since, furthermore, the filtering bank has to continue to provide for the perfect reconstruction of the signal in the absence of quantification, the problem of perfect reconstruction in the synthesis is resolved by bringing into play an additional dimension, namely the dimension of time. Indeed, when the analysis filters are modified, there appears a transient phase where the samples coming from the old filter and new filter are convoluted in synthesis. FIG. 3 show a two-band filtering bank, in which two sets of analysis filters $[H_0(z), H_1(z)]$ and $[H_0'(z), H_1'(z)]$ as well as two sets of additional synthesis filters $[G_0(z), G_1(z)]$ and $[G_0'(z), G_1'(z)]$ may be switched over. In the presence of a filter having a length 4, the problem is resolved as shown in FIG. 4 by using a set of synthesis filters $[G_0''(z), G_1''(z)]$ during the transient phase. To simplify the depiction of FIG. 4, the filters have been represented with a length of 4. The number of transient filters is given by the relationship (N/2−1) where N is the length of the filters.

Outside the transition phase, the analysis and synthesis filters are related by the conventional relationship:

$$\begin{cases} G_0(z) = 2H_1(-z) \\ G_1(z) = -2H_0(-z) \end{cases} \quad (4)$$

When the filters are laid out in the form of a trellis, the problem of the switch-over of the filters is resolved directly. For this purpose, it is enough to observe the mechanism of the propagation of information through the structure of the trellis. In this case, the coefficients of the cell may be modified in any way in analysis provided that this modification is passed on to the synthesis at an appropriate point in time. Perfect reconstruction is then always ensured provided that the matrix product $$E_i \times F_i = l \quad (5) \text{ is met}$$

where $E_i$ and $F_i$ represent respectively the transfer matrices of the analysis and synthesis filters and l represents the identity matrix.

More specifically, if the coefficients of each cell $E_i$ are modified at an instant n, this time being counted after sub-sampling, the property of perfect reconstruction is kept provided that the coefficients of the corresponding synthesis cell $F_i$ are updated at the instant n+L−1−i, L representing the total number of cells of the trellis. The delay is given by the cells of the trellis located between $E_i$ and $F_i$.

The optimizing of the criterion in the case of the CQF type filters is achieved by the known Newton's algorithm. The convergence may be improved by modifying the algorithm by means of the Levenberg-Marquardt method. The optimization in the case of the SAOO type trellis and the generalized trellis is done under constraint by means of the Lagrange-Newton algorithm. The correlation matrices of the signals needed for the computation are obtained by recurrence on the order of the trellis and may be expressed as a function of the signals at the input of each filtering cell to be optimized.

Figure 5:
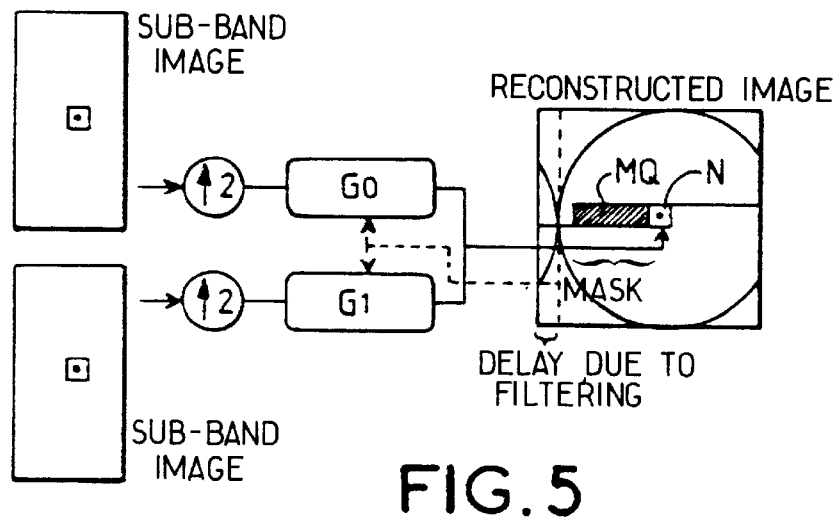
FIG. 5 shows a mode of operation of an adaptive synthesis bank.
Figure 6:
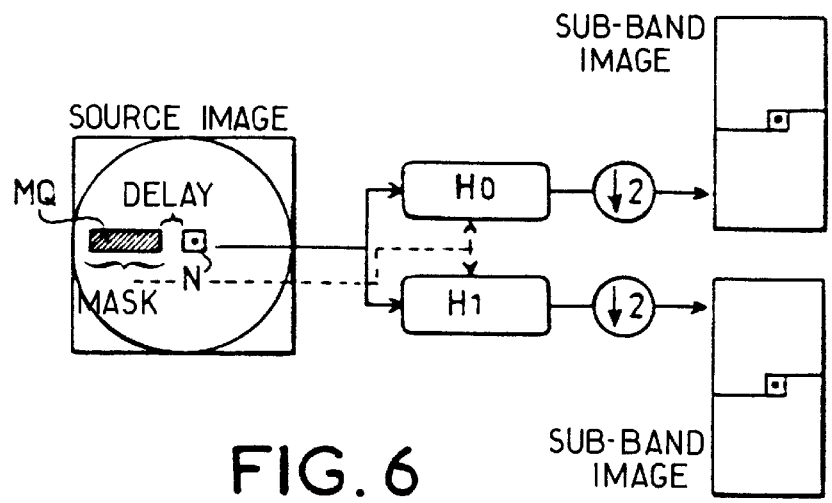
FIG. 6 shows the principle of implementation of an adaptive analysis bank.

Newton's algorithm calls for an efficient initializing of the filters. This initializing is given at the outset by a set of filters determined on an a priori basis used in a conventional operation of splitting into sub-bands. During filtering, the pair of filters computed for the previous pixel is used to initialize the algorithm for the computation of the current pixel. This makes it possible to provide for a faster conversion of the algorithm and to obtain coefficients of filters that minimize the criterion according to the relationship (3) described here above. Since the analysis filters may be modified at each pixel after sub-sampling of the image at input of the filter cell to be optimized, and since the transmission, to the decoder, of the coefficients of the analysis filters that are indispensable for the computation of the synthesis filters would lead to prohibitive extra cost, the method according to the invention implements a technique that enables the automatic recomputation of the synthesis filters at the decoder. According to the invention, the statistical properties of the signal at input of the cell to be optimize are estimated on the basis of a mask of pixels. In the absence of quantification, the synthesis filters may be recomputed on the reconstructed signal as shown in FIG. 5 where the same mask MQ of pixels as the one used for the computation of analysis filters is used, inasmuch as it is possible already to have the reconstructed corresponding pixels available. For this purpose, it is indispensable to place the estimation mask accurately at analysis to take account of the delay contributed by the bank of filters as is shown in FIG. 6. Under these conditions, if L is used to designate the number of cells of the trellis of the filters used in the splitting bank and if M is used to designate the number of levels on the branch subjected to the greatest splitting, the total delay contributed by the bank is given by the relationship:

$$D=(2^M-1)\times(2\times L-1)$$

Figure 7:
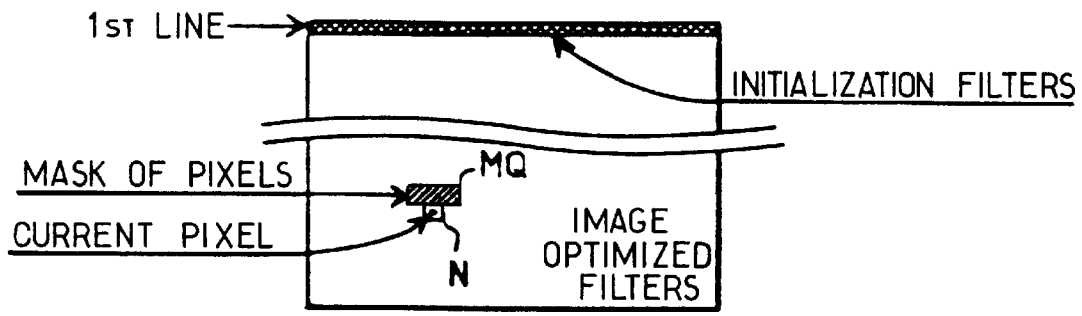
FIG. 7 shows a mode of positioning of an estimation mask.

Since this delay may become great when the splitting into sub-bands is extensive or when the lengths of the filters increase, there is a risk that the mask of pixels needed to estimate the statistics for the optimization of the filters may be distant from the pixel to be filtered. The delay D computed here above corresponds to the maximum delay between the filtered pixel and the estimation mark. For the intermediate levels in the tree, this delay is smaller. In order to preserve a local character in the optimization, it is preferable to choose, as can be seen in FIG. 7, to extract the mask MQ from the preceding rows or columns located above, to the left of the current pixel N to be filtered.

It has to be noted that so long as the pixels of the estimation mask are not available at analysis, namely at initialization because of the delay given by the bank of filters, it is necessary to use a set of filters determined on an a priori basis and known to the encoder and the decoder.

When there is quantification, the product of the transfer matrices $E_i$ and $F_i$ of each pair of analysis and synthesis cells must constantly verify the identity, any error on one of the coefficients of one of the two cells necessarily resulting in an error of the reconstruction on the signal. Since the trellised structures are very sensitive to these errors and since, when the sub-band signals are quantified, the synthesis filters are recomputed on the reconstructed signal on the basis of the quantified signals, the product of the matrices $E_i$ and $F_i$ can no longer meet with the condition of identity. Under these conditions, there appears a drift in the recomputation of the synthesis filters due to the error of quantification. To prevent this phenomenon, the synthesis and analysis filters are computed according to the invention on the same signal since the mask of pixels needed for the computation of the analysis filters is extracted, as can be seen in FIG. 8, from the signal reconstructed locally at the encoder.

Figure 8:
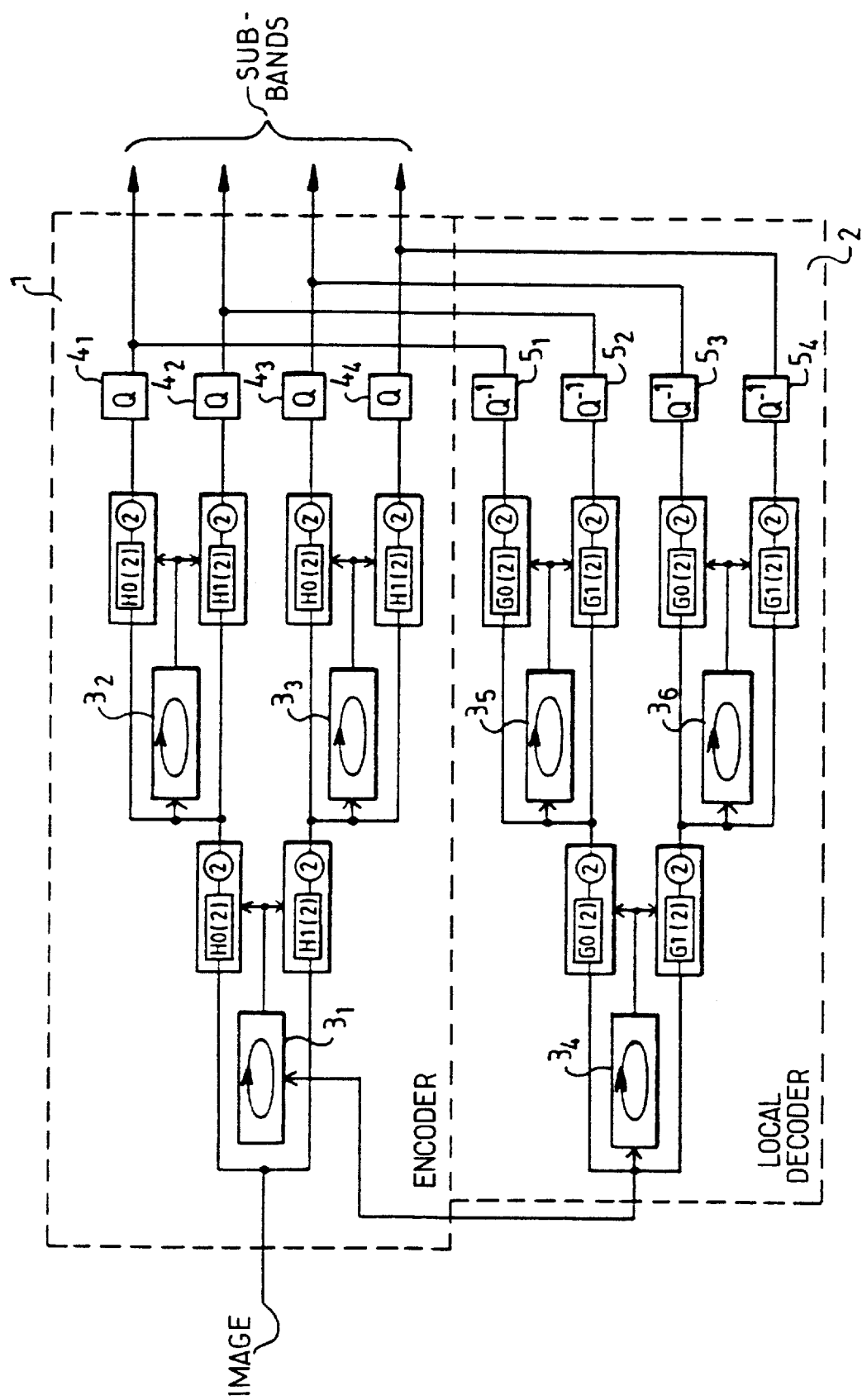
FIG. 8 shows a mode of making a four-band adaptive encoder according to the invention.

To this end, to the filters $H_0(z)$ $H_1(z)$ of the sub-band splitting tree of the encoder, shown within a box of dashes 1 in FIG. 8, there is added a reconstruction tree formed by the synthesis filters $G_0(z)$ and $G_1(z)$ also shown within a box of dashes 2 forming a local decoder. The coefficients of the filters are computed by one or more microprocessor $3_1 \ldots 3_6$ receiving the signal applied to each input of the filters. The corresponding processors are programmed to carry out the computation of the coefficients according to the optimization criterion defined by the relationship (3). The splitting tree of FIG. 8 is appropriate for an adaptive filtering of a television signal, for example a filtering with four sub-bands. With a view to the transmission of the sub-band signals, quantifiers $4_1$ to $4_4$ are placed at the output of the banks of filters to quantify each sub-band.

Corresponding dequantification circuits $5_1$ to $5_4$ are placed at the inputs of the banks of filters of the reconstruction tree of the local decoder 2.

Figure 9:
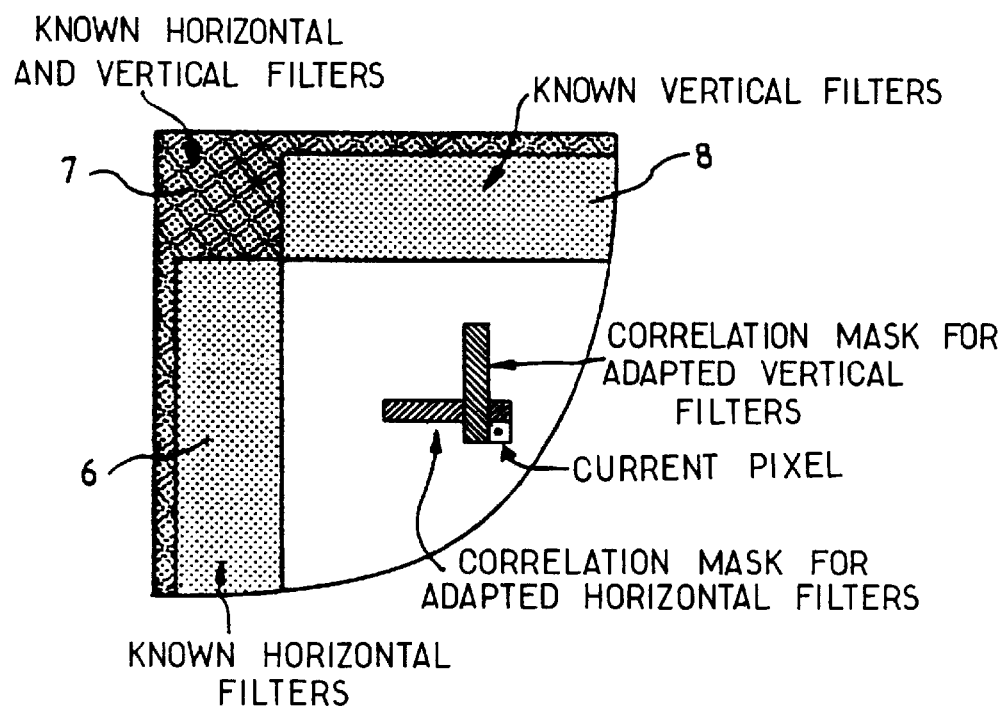
FIG. 9 shows a mode of processing the edges and of initializing the filters.

It must be noted that the mask of pixels must imperatively be extracted from the causal environment of the pixel to be filtered both at the encoder and at the decoder. Furthermore, certain parts of the image must be filtered with filters known to the encoder 1 and the decoder 2 for the processing operations at initialization and on the upper edge and the left-hand edge of the image. In the case of the layout with four sub-bands according to FIG. 8, this is expressed in FIG. 9 by the appearance of zones 6, 7 and 8. By using CQF filters, the processing of the edges could be done in a known way by circular periodization.

Naturally, the invention is not limited to the examples described. Other embodiments can also be envisaged. These would consist, for example, of the grouping in one and the same processor, of the computations needed to optimize the filters.

What is claimed is:

1. An adaptive method using sub-band analysis filters and synthesis filters for image encoders and decoders linked by a transmission channel of the type consisting, at the analysis filters, in splitting up the signal to be transmitted on the transmission channel into sub-bands in a tree structure by filtering and decimation wherein said method consists of the performance, in the analysis filters, of a local adaptive filtering in each sub-band.

2. A method according to claim 1 wherein, in order to carry out a local adaptive filtering in each sub-band, said method consists in computing the analysis filters on the basis of sub-band signals quantified and reconstructed locally, at the encoder.

3. A method according to one of the claims 1 and 2, consisting of the computation, for each current pixel of the image and in each sub-band, of the coefficients of analysis and synthesis filters from a predetermined number of preceding pixels reconstructed in an analysis encoder.

4. A method according to claim 3, wherein the predetermined number of reconstructed pixels is located on the same line as the current pixel.

5. A method according to either of the claims 1 or 2, wherein the computation of the analysis and synthesis filters is done by means of masks of identical pixels, and wherein the mask of the analysis filters is lagged with respect to the current pixel by a delay corresponding to the delay given by the filtering.

6. A method according to claim 5, wherein the mask of pixels is extracted from the lines or from the columns that precede the line or the column of the current pixel to make the optimization of the filters keep its local character.

7. A method according to any of the claims 1 to 2, consisting in using a set of filters known to the encoder and to the decoder when the mask of pixels cannot be constituted.

8. A method according to any of the claims 1 to 2, consisting in initializing the computation of the filters from the set of coefficients optimized on the pixel that precedes the current pixel.

9. A method according to any of the claims 1 to 2, consisting in optimizing the filters by Newton's method by using the estimation of the matrices of correlation of the sub-band signals obtained by recurrence on the order of the trellis from the signal applied to the input of the trellis.

10. A method according to any of the claims 1 to 2, consisting in carrying out the adaptive filtering in each sub-band according to a criterion tending to minimize the cost of encoding by ensuring the independence and whiteness of the sub-band signals.

11. An adaptive image encoder and decoder for providing sub-band analysis and synthesis for a transmission channel linkage, comprising:

a plurality of sub-band analysis filters and synthesis filters associated with said image encoder and decoder;

wherein said analysis filters include a means for splitting up the signals to be transmitted on the transmission channels into sub-bands in a tree-like structure by filtering and decimation, said means for splitting including a bank of filters having coefficients functionally related to a signal used for optimizing said filters to provide a local adaptive filtering in each sub-band.

* * * * *